United States Patent
Takahashi et al.

(10) Patent No.: US 10,251,221 B2
(45) Date of Patent: Apr. 2, 2019

(54) INDUCTION COOKING DEVICE

(71) Applicant: Panasonic Intellectual Property Management Co., Ltd., Osaka-shi, Osaka (JP)

(72) Inventors: Tomoya Takahashi, Hyogo (JP); Hiroshi Isago, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 89 days.

(21) Appl. No.: 15/592,555

(22) Filed: May 11, 2017

(65) Prior Publication Data

US 2018/0077761 A1 Mar. 15, 2018

(30) Foreign Application Priority Data

Sep. 15, 2016 (JP) .................................. 2016-180817

(51) Int. Cl.
*H05B 6/42* (2006.01)
*A47J 36/24* (2006.01)
*H05B 6/12* (2006.01)

(52) U.S. Cl.
CPC ............ *H05B 6/42* (2013.01); *A47J 36/2483* (2013.01); *H05B 6/1209* (2013.01); *H05B 6/1263* (2013.01); *H05B 6/1281* (2013.01)

(58) Field of Classification Search
CPC .. H05B 6/1263; H05B 6/1209; H05B 6/1281; A47J 36/2483
USPC ........................................................ 219/623
See application file for complete search history.

(56) References Cited

U.S. PATENT DOCUMENTS

| 8,003,925 B2* | 8/2011 | Okada | H05B 6/1263 219/623 |
| 8,884,197 B2* | 11/2014 | Gagas | H05B 6/1263 219/600 |
| 2017/0257913 A1* | 9/2017 | Vengroff | H05B 6/062 |
| 2018/0058701 A1* | 3/2018 | Ha | F24C 15/101 |

FOREIGN PATENT DOCUMENTS

| JP | S62-136091 U | 8/1987 |
| JP | 2006-147303 A | 6/2006 |
| JP | 2013-118197 A | 6/2013 |
| WO | 2008/026443 A1 | 3/2008 |

OTHER PUBLICATIONS

The Extended European Search Report dated Nov. 30, 2017 for the related European Patent Application No. 17167449.2.

\* cited by examiner

*Primary Examiner* — Timothy L Maust
(74) *Attorney, Agent, or Firm* — Brinks Gilson & Lione

(57) ABSTRACT

An induction cooking device includes: a housing in which at least one of a heat generating component and a heat dissipating component is disposed; a top plate which is held at an upper portion of the housing and on which an object to be heated is to be placed; a heating coil unit disposed inside the housing, below an undersurface of the top plate; a first cooling fan which is disposed inside the housing, and blows first cooling air to cool the at least one of the heat generating component and the heat dissipating component; a second cooling fan which is disposed inside the housing, takes in at least a portion of the first cooling air, and blows second cooling air to cool the heating coil unit; and an air guide which guides the second cooling air to the heating coil unit.

10 Claims, 9 Drawing Sheets

INDUCTION COOKING DEVICE

CROSS REFERENCE TO RELATED APPLICATIONS

This application claims the benefit of priority of Japanese Patent Application Number 2016-180817 filed on Sep. 15, 2016, the entire content of which is hereby incorporated by reference.

BACKGROUND OF THE INVENTION

1. Technical Field

The present disclosure relates to an induction cooking device for home or business use. In particular, the present disclosure relates to a mechanism for cooling heat generating components and heat dissipating components of the induction cooking device.

2. Description of the Related Art

The induction cooking device includes a heating coil for induction heating, and a field circuit. The field circuit includes an inverter circuit which supplies a high frequency current to the heating coil, a driver which drives the inverter circuit, a controller, and a power supply. Various electronic components which constitute the inverter circuit, the driver, the controller, and the power supply mentioned above are mounted on a circuit board disposed inside the induction cooking device.

When an object is inductively heated, heating efficiency differs depending on the magnetic permeability and resistivity of the material of, for instance, cookware which is an object to be heated. Accordingly, heat loss increases and the amount of heat generated by components, such as a heating coil, increases in the induction cooking device, under a condition that cookware having relatively low heating efficiency is used among various types of cookware.

The electronic components on the circuit board include an electronic component which generates an extremely large amount of heat during operation such as, for example, an insulated gate bipolar transistor (IGBT) or a diode bridge, and furthermore an electronic component such as a capacitor which generates a comparatively small amount of heat. The cooling effect is increased by attaching a heat sink to an electronic component which generates a large amount of heat.

Furthermore, as described above, cooling air from a blower disposed in the induction cooking device compulsorily cools a heating coil and an electronic component which generate a large amount of heat, thus allowing the induction cooking device to normally operate.

For a traditional induction cooking device, a configuration has been proposed in which a large blower which produces a large amount of air is used so that cooling air from the blower is highly efficiently directed to heat generating portions and dissipating portions of a heating coil and an electronic component which generate heat in order to ensure cooling the heating coil and the electronic component (for example, see Japanese Unexamined Utility Model Application Publication No. S62-136091, Japanese Unexamined Patent Application Publication No. 2006-147303, and Japanese Unexamined Patent Application Publication No. 2013-118197).

Induction cooking devices are highly efficient in converting input energy into heat. Moreover, it is easy to control the cooking temperature with induction cooking devices. Further, induction cooking devices produce little radiant heat, are safe, and are easy to clean. Accordingly, induction cooking devices have more advantages than other cooking devices. As such, induction cooking devices are used in many places, and come in a variety of types suitable for different places, such as built-in devices, stand-alone devices, and table-top devices. Examples of business-use induction cooking devices include counter-top devices that are placed on a kitchen counter, and recessed devices that are built into a kitchen counter. These induction cooking devices are designed to withstand use over long periods of time.

Induction cooking devices as described above come in a variety of types according to usage, and the induction cooking devices of all the types are configured to highly efficiently direct cooling air from the blower to a heating coil and an electronic component.

SUMMARY OF THE INVENTION

The present disclosure provides a space-saving compact induction cooking device which has high reliability and exhibits improved cooling performance although small blowers are used.

Specifically, an induction cooking device according to the present disclosure includes: a housing in which at least one of a heat generating component and a heat dissipating component is disposed; a top plate which is held at an upper portion of the housing and on which an object to be heated is to be placed; a heating coil unit disposed inside the housing, below an undersurface of the top plate; a first cooling fan which is disposed inside the housing, and blows first cooling air to cool the at least one of the heat generating component and the heat dissipating component; a second cooling fan which is disposed inside the housing, takes in at least a portion of the first cooling air, and blows second cooling air to cool the heating coil unit; and an air guide which guides the second cooling air to the heating coil unit.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

Figure 1:
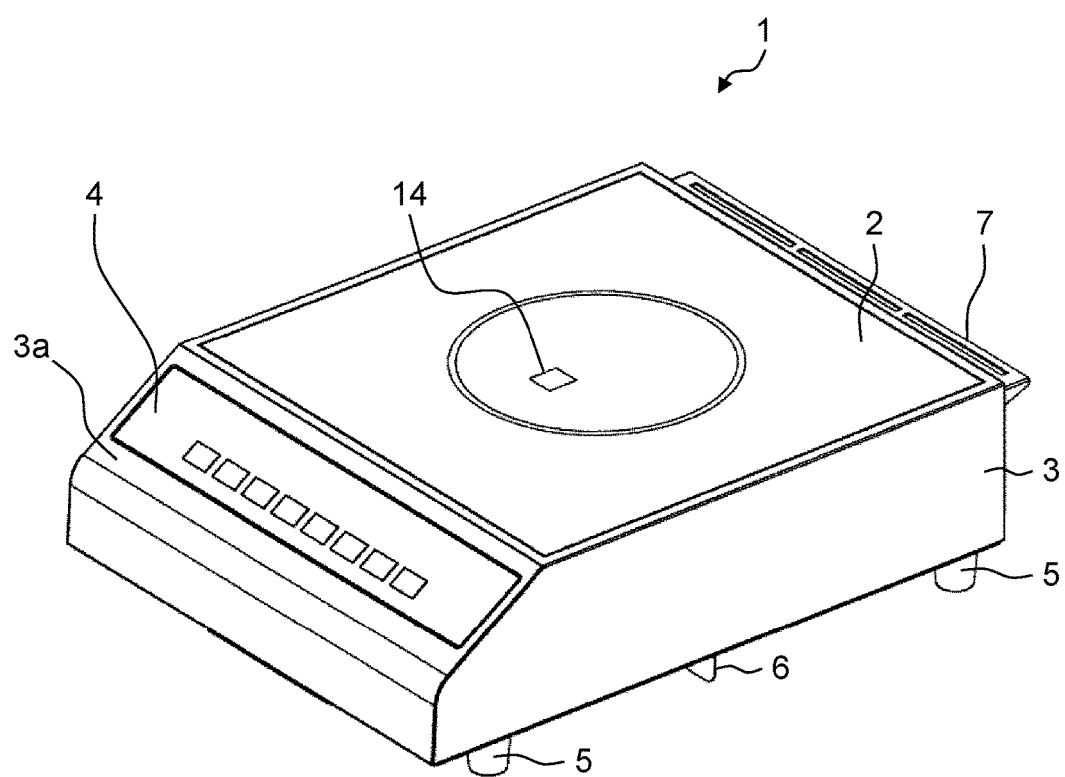
FIG. 1 is a perspective view illustrating the entire configuration of an induction cooking device according to an embodiment of the present disclosure.

DETAILED DESCRIPTION OF THE PREFERRED EMBODIMENTS (Underlying Knowledge Forming Basis of the Present Disclosure)

The inventors gained the following knowledge as a result of diligent work to further improve the merchantable quality of induction cooking devices.

Recently, the external dimensions of any type of the induction cooking devices such as built-in devices, stand-alone devices, and table-top devices have been reduced in order to reduce the size the devices and also to save space for the devices. Accordingly, a blower and an air flow path for sending cooling air which occupy a large space inside a device preferably have sizes reduced to the extent possible. Size reduction and space saving are particularly important issues for a home-use table-top induction cooking device placed on a kitchen counter and a business-use counter-top induction cooking device placed on a counter of a kitchen. Thus, a configuration which can efficiently cool a heat generating component using a small blower is to be achieved.

Based on such new knowledge, the inventors arrived at the following disclosure.

An induction cooking device according to a first aspect of the present disclosure includes: a housing in which at least one of a heat generating component and a heat dissipating component is disposed; a top plate which is held at an upper portion of the housing and on which an object to be heated is to be placed; a heating coil unit disposed inside the housing, below an undersurface of the top plate; a first cooling fan which is disposed inside the housing, and blows first cooling air to cool the at least one of the heat generating component and the heat dissipating component; a second cooling fan which is disposed inside the housing, takes in at least a portion of the first cooling air, and blows second cooling air to cool the heating coil unit; and an air guide which guides the second cooling air to the heating coil unit.

Accordingly, a highly efficient air flow path can be formed using the small first cooling fan, the small second cooling fan, and the air guide, and thus a reliable, compact, and space-saving induction cooking device which exhibits improved cooling performance can be provided.

According to the induction cooking device according to a second aspect of the present disclosure, in the first aspect, the air guide may increase a flow velocity of the second cooling air, and guide the second cooling air to the heating coil unit.

This allows the second cooling air to further efficiently cool a heating coil unit.

According to the induction cooking device according to a third aspect of the present disclosure, in the first or second aspect, the first cooling fan and the second cooling fan may be disposed one above another such that at least a portion of the first cooling fan and at least a portion of the second cooling fan overlap in plan view.

This allows the second cooling fan to efficiently take in the first cooling air blown from the first cooling fan.

According to the induction cooking device according to a fourth aspect of the present disclosure, in the third aspect, the second cooling fan may have an air inlet located directly above an air outlet of the first cooling fan.

Accordingly, the distance between the air outlet of the first cooling fan and the air inlet of the second cooling fan is short, and thus the first cooling air blown from the first cooling fan can be still more efficiently taken in by the second cooling fan.

In the third aspect, the induction cooking device according to a fifth aspect of the present disclosure may further include: an intake restrictor disposed between an air outlet of the first cooling fan and an air inlet of the second cooling fan, and having an opening, wherein the intake restrictor may restrict a volume of the at least a portion of the first cooling air which the second cooling fan takes in.

Accordingly, the volume of the first cooling air drawn in by the second cooling fan can be adjusted.

According to the induction cooking device according to a sixth aspect of the present disclosure, in the fifth aspect, the opening may have an area which is at least 20% and at most 50% of an area of the air inlet of the second cooling fan.

This allows the second cooling fan to yield appropriate cooling effect.

According to the induction cooking device according to a seventh aspect of the present disclosure, in one of the first to sixth aspects, the second cooling fan may be smaller in size than the first cooling fan, and have an air-blowing capability lower than an air-blowing capability of the first cooling fan.

Accordingly, space can be saved by reducing the size of the second cooling fan while securing sufficient air blowing capability of the second cooling fan.

According to the induction cooking device according to an eighth aspect of the present disclosure, in one of the first to seventh aspects, the air guide may include: an air flow path extending in an air flow direction; an entrance opening formed on an air entering side of the air flow path; and an exit opening formed on an air exiting side of the air flow path, and an area of the exit opening perpendicular to the air flow direction may be at most half an area of the entrance opening perpendicular to the air flow direction.

This sufficiently increases the flow velocity of the second cooling air to efficiently cool the heating coil unit.

In one of the first to eighth aspects, the induction cooking device according to a ninth aspect of the present disclosure may further include: an inner housing in which the at least one of the heat generating component and the heat dissipating component is disposed, the inner housing being disposed inside the housing and supporting the heating coil unit from below, wherein the first cooling fan may be disposed on a front surface side inside the inner housing, and the inner housing may have, on a rear surface side, a gap for discharging the first cooling air, the first cooling air being discharged after cooling the at least one of the heat generating component and the heat dissipating component.

This achieves highly efficient cooling configuration in the housing.

In the fifth or sixth aspects, the induction cooking device according to a tenth aspect of the present disclosure may further include: a divider plate disposed at the air outlet of the first cooling fan, wherein the divider plate may divide the first cooling air into portions according to an amount of heat dissipated by the at least one of the heat generating component and the heat dissipating component in the housing, the opening may be directly above the divider plate, and the second cooling fan may partially take in each of the portions of the first cooling air divided by the divider plate through the opening.

Accordingly, while efficiently cooling components according to the amount of heat dissipated by heat generating components and heat dissipating components, the volume of the first cooling air taken in by the second cooling fan can be adjusted.

According to the induction cooking device according to an eleventh aspect of the present disclosure, in one of the first to tenth aspects, the housing may include a front surface which includes an inclined portion which is rearwardly inclined, and the first cooling fan and the second cooling fan may be disposed one above another and staggered in a front-to-rear direction along the inclined portion.

This allows the first cooling fan and the second cooling fan to be efficiently disposed in a narrow space in the housing.

Hereinafter, an embodiment which illustrates an induction cooking device according to the present disclosure is described in detail with reference to the drawings as appropriate. Note that the following embodiment describes a business-use counter-top induction cooking device which is placed on a kitchen counter top, but the configuration of the induction cooking device is an example. The present disclosure is not limited to the configuration described in the following embodiment, and also includes other types of induction cooking devices having the technical features according to the present disclosure. Note that in the description of the embodiment, the side of the induction cooking device where the user is located when using the induction cooking device is the front side (front surface side), and the side of the induction cooking device opposite the front side is the rear side (rear surface side). Moreover, the right and left sides in the embodiment are from the perspective of front side of the induction cooking device.

Embodiment

[1. Entire Configuration of Induction Cooking Device]

Figure 2:
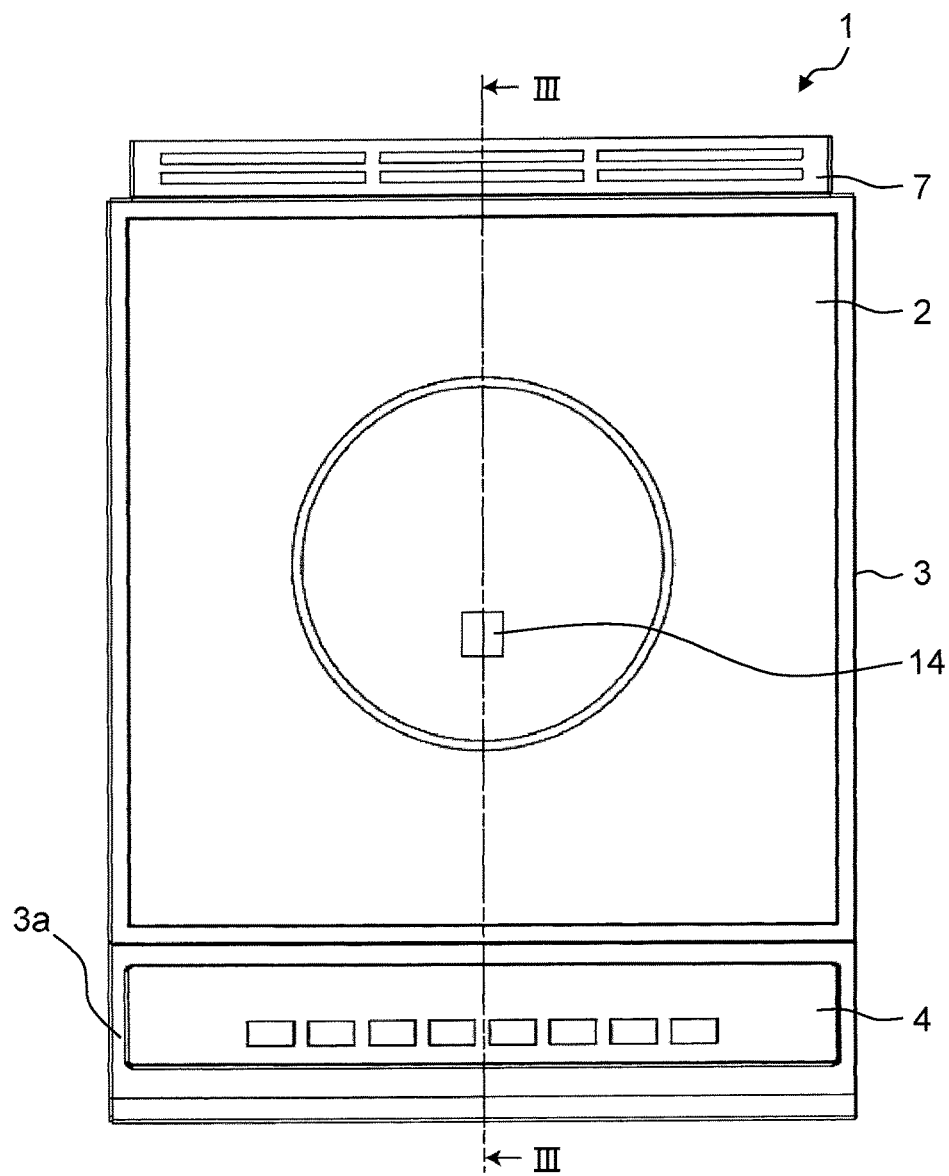
FIG. 2 is a plan view of the induction cooking device according to the embodiment.

FIG. 1 is a perspective view illustrating the entire configuration of an induction cooking device according to an embodiment of the present disclosure. FIG. 2 is a plan view of the induction cooking device according to the embodiment.

As illustrated in FIGS. 1 and 2, induction cooking device 1 according to the present embodiment is a business-use counter-top induction cooking device which is placed on, for instance, a kitchen counter.

Induction cooking device 1 according to the present embodiment has an external shape defined by box-shaped housing 3 which opens to the top surface side, and quadrilateral top plate 2 covering the top opening of housing 3. The upper surface of housing 3 is flush with the upper surface of top plate 2, and thus the upper surfaces are formed into a flat surface. An inclined surface (inclined portion 3a) which is rearwardly inclined is formed on the front surface side of housing 3.

Top plate 2 is, for example, a glass plate or a ceramic plate made of a heat-resist material having magnetic permeability and low thermal conductivity. A circular pattern is drawn on top plate 2, which indicates the heated region where, for example, cookware (for example, a pot) that is an object to be heated is to be placed. Top plate 2 also includes sensor window 14 for a temperature sensor (for example, an infrared sensor) for detecting the temperature of the object.

Control portion 4 for setting various settings for induction cooking device 1, such as setting the strength of the heat and setting time, is disposed on the inclined surface (inclined portion 3a) on the front surface side of induction cooking device 1.

A plurality of intake vents 12 (see FIG. 3 later described) are provided in the bottom surface of housing 3 of induction cooking device 1. In order to secure an intake space on the bottom surface side of housing 3 when induction cooking device 1 is placed on, for instance, a kitchen counter, a plurality of feet 5 are disposed protruding from the bottom surface of housing 3 (in the present embodiment, four feet are disposed one at each of the four corners of the bottom surface). Moreover, a plurality of exhaust vents 13 (see FIG. 3 later described) are provided on the rear surface side of induction cooking device 1. In order to secure an exhaust space on the rear surface side of housing 3, protruding rear spacer 7 is disposed at the upper portion of the rear surface of housing 3.

Note that in induction cooking device 1 according to the present embodiment, in order to prevent exhaust through exhaust vents 13 on the rear surface side from directly being drawn in through intake vents 12 on the bottom surface side, protruding intake/exhaust divider plate 6 is disposed on the bottom surface of housing 3 so as to separate, on the bottom surface side, the intake space for intake vents 12 from the exhaust space for exhaust vents 13 (see FIG. 3 later described).

[2. Internal Configuration of Induction Cooking Device]

Figure 3:
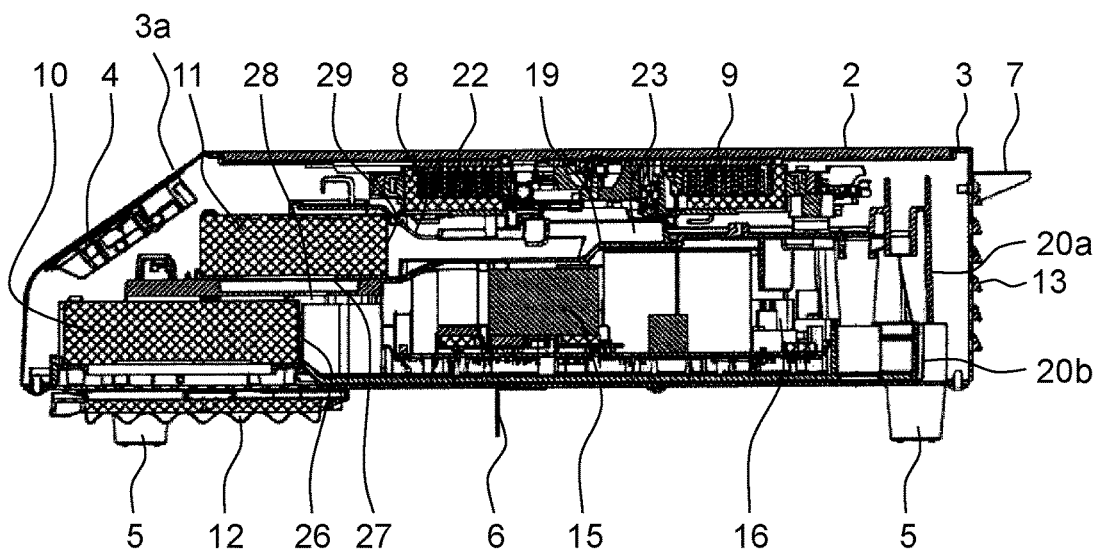
FIG. 3 is a cross-sectional view of the induction cooking device according to the embodiment illustrated in FIG. 2 taken along line III-III.

FIG. 3 is cross-sectional view of induction cooking device 1 according to the present embodiment illustrated in FIG. 2 taken along line III-III.

As illustrated in FIG. 3, various components are disposed inside housing 3, such as heating coil unit 8 which includes heating coil 9, inverter circuit 15 which supplies a high frequency current to heating coil 9, driver 16 which drives inverter circuit 15, power supply 17 (see FIG. 7 later described) which supplies power to driver 16, and controller 18 (see FIG. 7 later described) which controls driver 16.

In order to efficiently cool heat generating components and heat dissipating components of, for instance, inverter circuit 15, driver 16, and power supply 17, small first cooling fan 10 which includes a plurality of fans and small second cooling fan 11 serving as blowers are disposed inside housing 3. In the present embodiment, first cooling fan 10 and second cooling fan 11 are disposed one above the other in two vertical layers as illustrated in FIG. 3.

Figure 4:
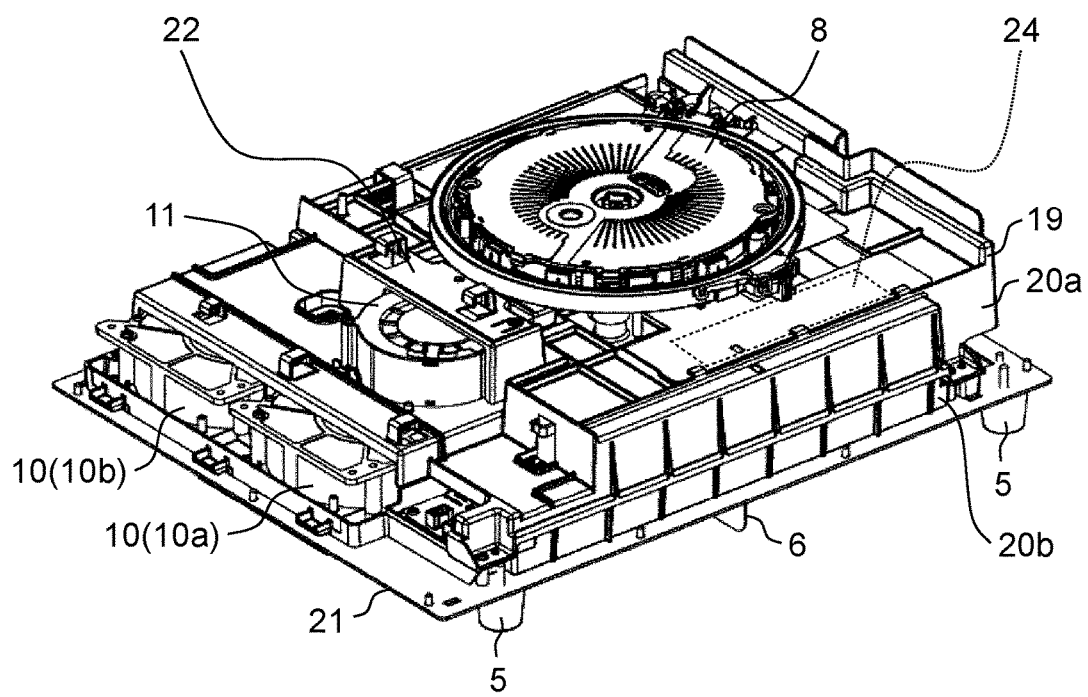
FIG. 4 is a perspective view illustrating an internal configuration of a housing of the induction cooking device according to the embodiment.
Figure 5:
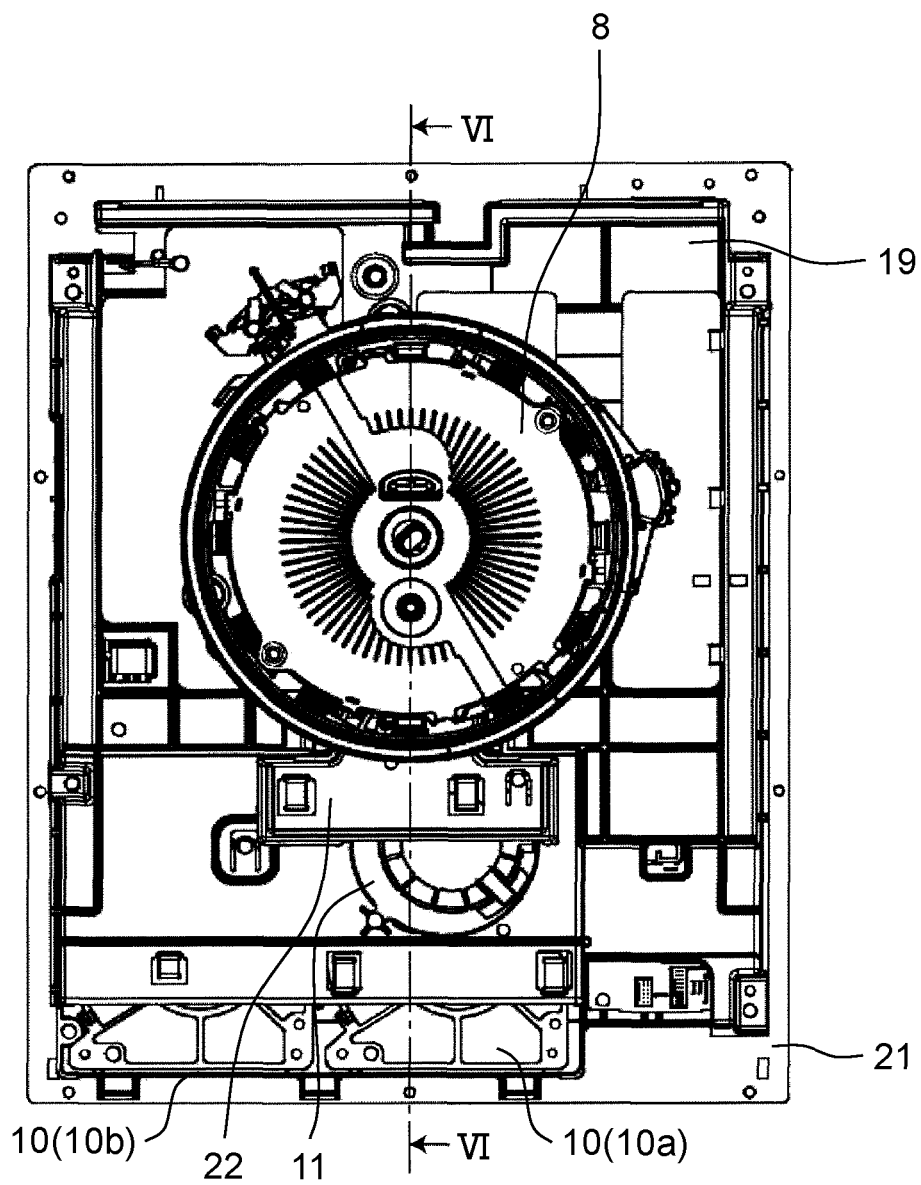
FIG. 5 is a plan view of the induction cooking device according to the embodiment illustrated in FIG. 4.
Figure 6:
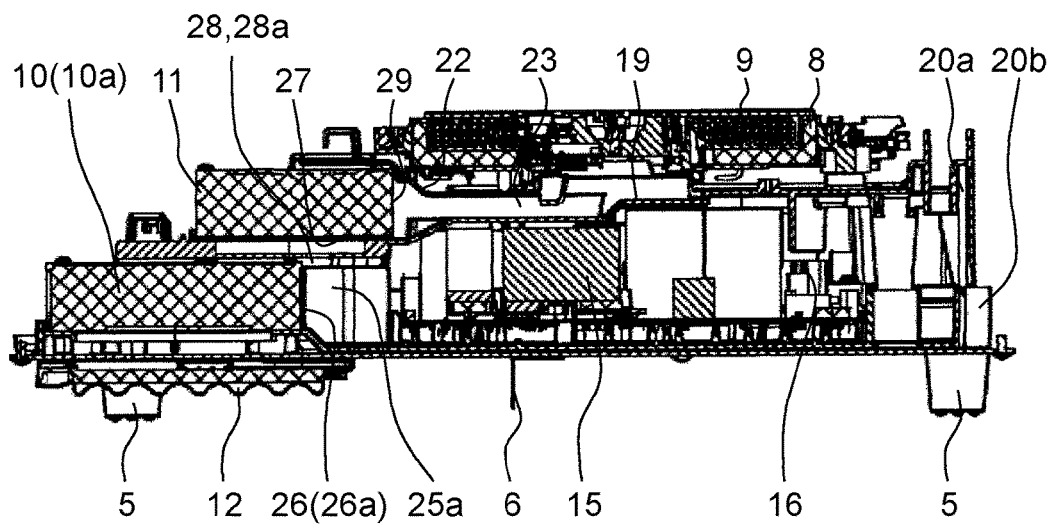
FIG. 6 is a cross-sectional view of the induction cooking device according to the embodiment illustrated in FIG. 5 taken along line VI-VI.

FIG. 4 is a perspective view illustrating the internal configuration of housing 3 of induction cooking device 1 according to the present embodiment. FIG. 4 illustrates the state where top plate 2 and housing 3 are removed. FIG. 5 is a plan view of induction cooking device 1 according to the present embodiment illustrated in FIG. 4. FIG. 6 is a cross-sectional view of induction cooking device 1 illustrated in FIG. 5 taken along line VI-VI.

As illustrated in FIG. 4, inner housing 19 is disposed inside housing 3. Inner housing 19 includes upper cover 20a which is an upper inner housing and lower cover 20b which is a lower inner housing. Components such as inverter circuit 15, driver 16, power supply 17, and controller 18 (see FIG. 6, and FIG. 7 later described) are disposed inside lower cover 20b of inner housing 19. Upper cover 20a is disposed over lower cover 20b so as to cover lower cover 20b.

Note that gap 19c (see FIG. 12 later described) is formed between the rear edge portion (rear surface side edge portion) of upper cover 20a and the rear edge portion (rear surface side edge portion) of lower cover 20b so that cooling air from first cooling fan 10 and second cooling fan 11 flows to the rear surface side of housing 3 and is discharged. The configuration of the gap between the rear edge portion of upper cover 20a and the rear edge portion of lower cover 20b is later described.

Heating coil unit 8 is disposed above upper cover 20a so as to cover components such as inverter circuit 15, driver 16, power supply 17, and controller 18. Heating coil unit 8 is an integrated single unit that is a stack of, for instance, heating coil 9, a heat shield plate (not illustrated), an insulating plate (not illustrated), and ferrite (not illustrated) above a shield plate (not illustrated). Heating coil 9 is a coil for inductively heating an object. The heat shield plate is a member for interrupting heat from a heated object, and is formed on the upper surface side of heating coil 9. The insulating plate is electrically insulating and disposed on the undersurface side of heating coil 9. The ferrite is highly magnetically permeable so as to yield great magnetic flux absorption effect, and is disposed on the undersurface side of the insulating plate.

Such integrated heating coil unit 8 is supported by upper cover 20a via an elastic member (for example, spring), and is in contact with the undersurface of top plate 2 (see FIG. 3).

Lower cover 20b is fixed to bottom plate 21 of housing 3. Furthermore, first cooling fan 10 (right first fan 10a and left first fan 10b) is disposed as blowers on the front surface side of lower cover 20b. Intake vents 12 (see FIG. 3) are formed on the front surface side of bottom plate 21 of housing 3. First cooling fan 10 (right first fan 10a and left first fan 10b) have air inlets (not illustrated) for taking in air from the outside of the device through intake vents 12, and air outlets 26 (26a, 26b) for blowing first cooling air (see FIG. 7 later described). The first cooling air flows rearwardly inside housing 3, and thereafter is discharged through exhaust vents 13 (see FIG. 3) on the rear surface side. First cooling fan 10 is constituted by a thin sirocco fan, for example, and is disposed under inclined portion 3a on the front surface side of housing 3 (see FIG. 3).

Note that the present embodiment describes an example in which first cooling fan 10 is constituted by two cooling fans (right first fan 10a and left first fan 10b), yet the number of cooling fans which constitute first cooling fan 10 is determined as appropriate according to, for instance, the specification of induction cooking device 1 and/or the cooling capabilities of the cooling fans.

Of course, first cooling fan 10 may be constituted using a single cooling fan, and the single cooling fan may achieve the function of the first cooling fan described in the present embodiment.

In induction cooking device 1 according to the present embodiment, second cooling fan 11 is disposed above upper cover 20a of inner housing 19. Second cooling fan 11 has air inlet 27 for taking in a portion of first cooling air blown out through air outlet 26 of first cooling fan 10, and air outlet 29 for blowing out second cooling air.

As illustrated in FIGS. 4 to 6, second cooling fan 11 is disposed above first cooling fan 10 (right first fan 10a) such that at least a portion of first cooling fan 10 and at least a portion of second cooling fan 11 vertically overlap. In the present embodiment, first cooling fan 10 and second cooling fan 11 are horizontally staggered in plan view. Air inlet 27 of second cooling fan 11 is located directly above air outlet 26 (26a) of first cooling fan 10 (right first fan 10a). Accordingly, a portion of first cooling air blown through air outlet 26 (26a) of first cooling fan (right first fan 10a) is directly taken in by second cooling fan 11 through air inlet 27 of second cooling fan 11.

Note that second cooling fan 11 is constituted by, for example, a thin sirocco fan, smaller than first cooling fan 10, and has an air-blowing capability lower than the air-blowing capability of first cooling fan 10. First cooling fan 10 and second cooling fan 11 are disposed one above the other, and staggered in the front-to-rear direction along the inner surface of inclined portion 3a of housing 3.

A portion of first cooling air is directly drawn in by second cooling fan 11, which means that neither a heat generating component nor a heat dissipating component exists in an air flow path that connects air outlet 26 of first cooling fan 10 and air inlet 27 of second cooling fan 11.

As described above, first cooling fan 10 and second cooling fan 11 are disposed one above the other in two vertical layers, in induction cooking device 1 according to the present embodiment. First cooling air from first cooling fan 10 in the lower layer cools heat generating components and heat dissipating components of, for instance, inverter circuit 15, driver 16, and power supply 17 inside lower cover 20b. Furthermore, at least a portion of first cooling air from first cooling fan 10 is directly drawn in by second cooling fan 11 in the upper layer, and second cooling air from second cooling fan 11 in the upper layer cools, for instance, heating coil unit 8 disposed above upper cover 20a.

Figure 7:
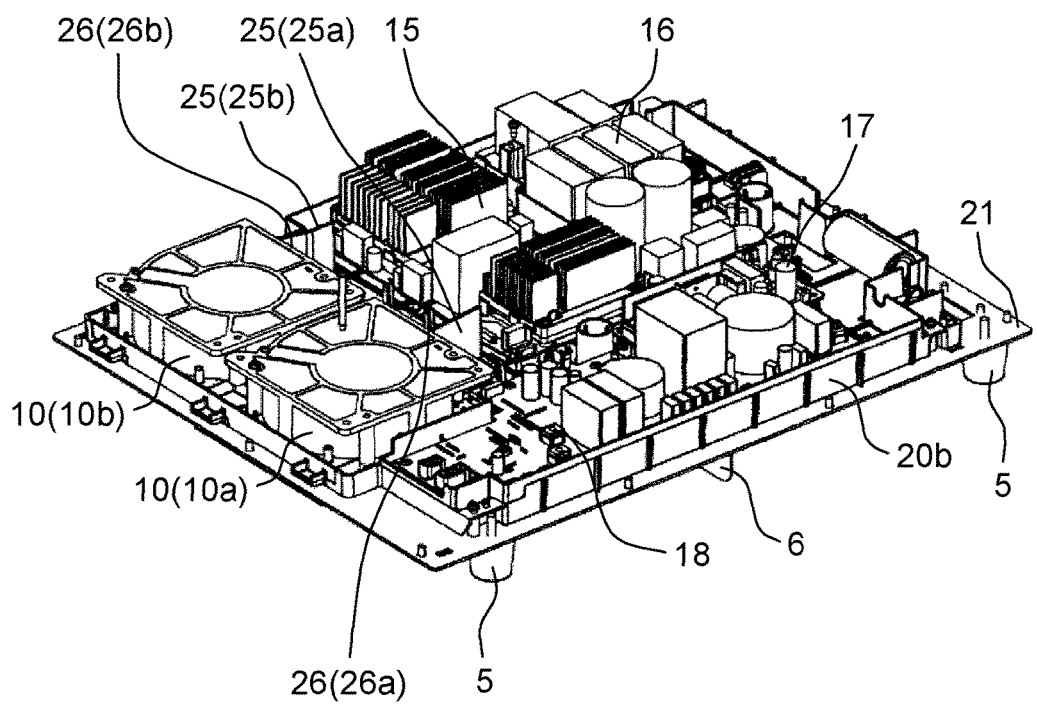
FIG. 7 is a perspective view illustrating a state where an upper cover inside the housing of the induction cooking device according to the embodiment is removed.

FIG. 7 is a perspective view illustrating the state where upper cover 20a inside housing 3 of induction cooking device 1 according to the embodiment is removed. FIG. 7 illustrates components disposed inside lower cover 20b.

As illustrated in FIG. 7, two thin cooling fans (right first fan 10a and left first fan 10b) included in first cooling fan 10 are horizontally disposed side by side on the front surface side of lower cover 20b, and blow first cooling air to the rear surface side. Inverter circuit 15 is disposed on the rear surface side of first cooling fan 10, and driver 16 is disposed on the rear surface side of inverter circuit 15. Power supply 17 and controller 18 are disposed side by side in the front-to-rear direction on the right of inverter circuit 15.

As described above, inside lower cover 20b (see FIG. 4) of inner housing 19, inverter circuit 15, driver 16, power supply 17, and controller 18 are disposed side by side. Therefore, heat generating components and heat dissipating components of these components are efficiently cooled by first cooling air from first cooling fan 10.

With induction cooking device 1 according to the present embodiment, magnetic flux absorption member 24 made of, for example, ferrite is on upper cover 20a (see FIG. 4), in order to prevent electronic components inside inner housing 19 from being influenced by electromagnetic waves from heating coil unit 8 disposed above upper cover 20a. Although the present embodiment describes an example of a configuration in which magnetic flux absorption member 24 is disposed particularly above power supply 17 which is likely to be influenced by electromagnetic waves, the position of magnetic flux absorption member 24 is not limited to this example, and magnetic flux absorption member 24 may be disposed in consideration of the position of a component which is likely to be influenced by electromagnetic waves.

As illustrated in FIG. 7, divider plate 25 (25a, 25b) which divides first cooling air blown through air outlet 26 (26a, 26b) is disposed at air outlet 26 (26a, 26b) of first cooling fan 10 (right first fan 10a, left first fan 10b). Specifically, divider plate 25a and divider plate 25b are for dividing first cooling air blown through air outlet 26a of right first fan 10a and first cooling air blown through air outlet 26b of left first fan 10b, respectively.

Divider plate 25a disposed at air outlet 26a of right first fan 10a has a function of dividing the first cooling air so that the first cooling air is distributed to a power source substrate side on which power supply 17 is disposed and to an inverter substrate side on which inverter circuit 15 is disposed. Although an air volume ratio at which the first cooling air is divided by divider plate 25a is determined according to, for instance, the specification of induction cooking device 1 and/or the specification of the cooling fan, the volume of the first cooling air on the inverter substrate side is set higher than the volume of the first cooling air on the power source substrate side. Stated differently, the first cooling air is divided according to the amount of heat dissipated by heat generating components and heat dissipating components inside housing 3.

On the other hand, divider plate 25b is disposed at air outlet 26b of left first fan 10b so as to allow the first cooling air to flow substantially equally to the entire region on the inverter substrate side. First cooling fan 10 is constituted by a sirocco fan, and thus the direction in which the first cooling air is blown through air outlet 26 is limited to a fixed direction to a certain extent. Accordingly, a configuration is adopted in which by disposing divider plate 25b at air outlet 26b of left first fan 10b, the first cooling air from left first fan 10b is spread so as to cause the first cooling air to flow substantially equally across the entire region on the inverter substrate side.

In induction cooking device 1 according to the present embodiment, as described above, first cooling fan 10 and second cooling fan 11 have two-layered structure so that at least a portion of the first cooling air blown from first cooling fan 10 (right first fan 10a) in the lower layer is drawn in by second cooling fan 11 in the upper layer. As illustrated in FIG. 6, air inlet 27 of second cooling fan 11 is provided above air outlet 26a of right first fan 10a.

Upper cover 20a is disposed between air outlet 26a of right first fan 10a and air inlet 27 of second cooling fan 11. Opening 28a is formed in upper cover 20a (see FIG. 6) so that second cooling fan 11 can take in a certain volume of first cooling air. A portion of upper cover 20a in which opening 28a is provided forms intake restrictor 28 which restricts the volume of the first cooling air which second cooling fan 11 takes in. Intake restrictor 28 having opening 28a has a function of restricting the volume of the first cooling air drawn in by second cooling fan 11 in order to prevent second cooling fan 11 from drawing in too much first cooling air blown from right first fan 10a.

In induction cooking device 1 according to the present embodiment, the area of opening 28a of intake restrictor 28 is designed to be in a range from 20% to 50% of the area of air inlet 27 on the intake side of second cooling fan 11. Accordingly, the volume of the first cooling air drawn in by second cooling fan 11 is restricted.

As an example of a specific configuration in the present embodiment, the experiment conducted by the inventors shows that if the output (air volume) from first cooling fan 10 is 0.7 to 1.0 m³/min, a result satisfactory as cooling effect of second cooling fan 11 is obtained when the area of opening 28a is set to about 40% of the air intake area of second cooling fan 11 (area of air inlet 27 on the intake side). Note that in induction cooking device 1 of the present embodiment, opening 28a has a long narrow rectangular shape, and has an area that is about 40% of the area of circular air inlet 27 of second cooling fan 11.

In the present embodiment, as illustrated in FIG. 7, the first cooling air distributed to the right of divider plate 25a disposed at right first fan 10a is directed to the power source substrate side on which power supply 17 is disposed, whereas the first cooling air distributed to the left of divider plate 25a is directed to the inverter substrate side on which inverter circuit 15 is disposed.

Divider plate 25a is disposed at air outlet 26a of right first fan 10a, and opening 28a is located directly above divider plate 25a. Thus, divider plate 25a determines at what ratio a portion of the first cooling air distributed to the right and a portion of the first cooling air distributed to the left are drawn in by second cooling fan 11 via opening 28a.

In the present embodiment, divider plate 25a allocates intake volumes so that second cooling fan 11 draws in more first cooling air from the first cooling air distributed to the power source substrate side than from the first cooling air distributed to the inverter substrate side via opening 28a. Thus, allocating the intake volumes in such a manner prevents second cooling fan 11 from drawing in a large portion of the cooling air blown from right first fan 10a to the inverter substrate side via opening 28a.

Accordingly, the first cooling air is divided by divider plate 25a, and the volumes of the distributed first cooling air when drawn in through opening 28a are allocated by divider plate 25a. This prevents a significant decrease in the volume of the first cooling air blown from right first fan 10a to the inverter substrate side, and thus heat generating components and heat dissipating components disposed on the inverter board side are reliably cooled.

First cooling air drawn in by second cooling fan 11 via opening 28a of upper cover 20a is blown from second cooling fan 11 as the second cooling air, and cools, for instance, heating coil unit 8 disposed above upper cover 20a.

As illustrated in FIG. 6, air guide 22 which guides the second cooling air to heating coil unit 8 is disposed downstream of second cooling fan 11, in order to efficiently cool heating coil unit 8. Air guide 22 forms air flow path 23 which guides the second cooling air from air outlet 29 of second cooling fan 11 to directly under the central region of heating coil unit 8. Thus, the second cooling air blown from second cooling fan 11 is guided by air guide 22 and is blown to the central region of heating coil unit 8, to cool heat generating components of, for instance, heating coil 9.

After cooling heating coil 9, for instance, the second cooling air flows along the undersurface of top plate 2 to the rear surface side, and thereafter is discharged through exhaust vents 13 on the rear surface side of housing 3 (see FIG. 3) to the rear of induction cooking device 1. Note that exhaust vents 13 are formed such that the air discharged through exhaust vents 13 are blown downward.

Figure 8:
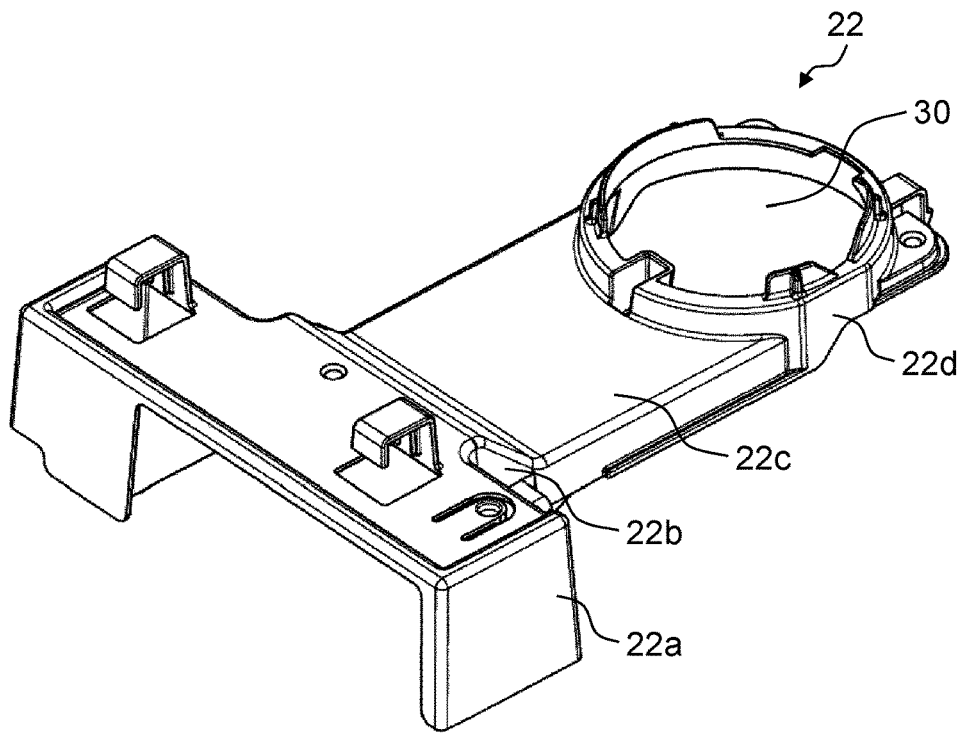
FIG. 8 is a perspective view illustrating an air guide of the induction cooking device according to the embodiment.
Figure 9:
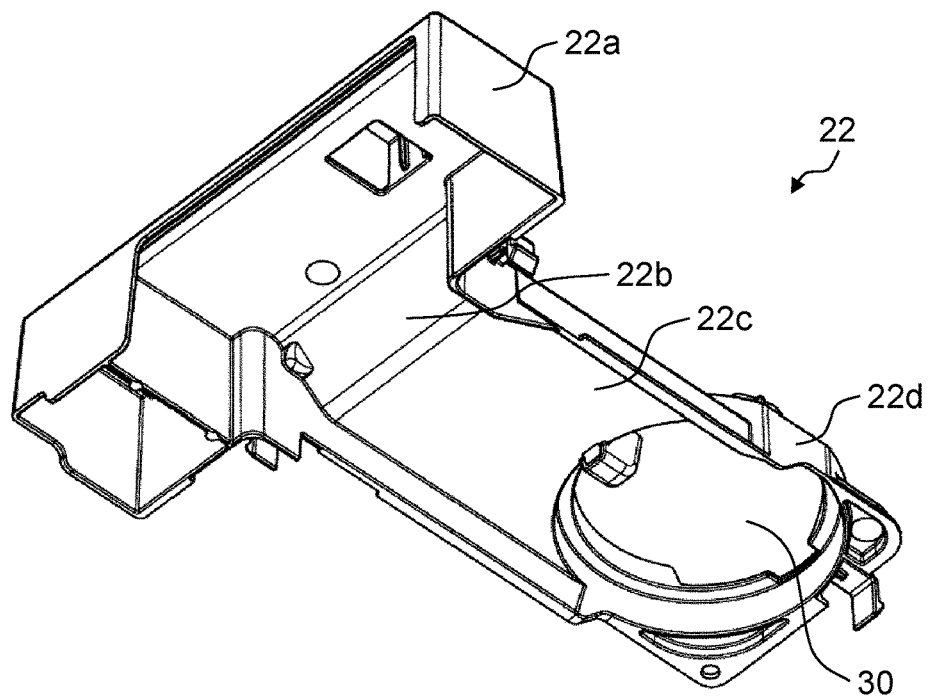
FIG. 9 is a perspective view illustrating an undersurface of the air guide of the induction cooking device according to the embodiment.
Figure 10A:
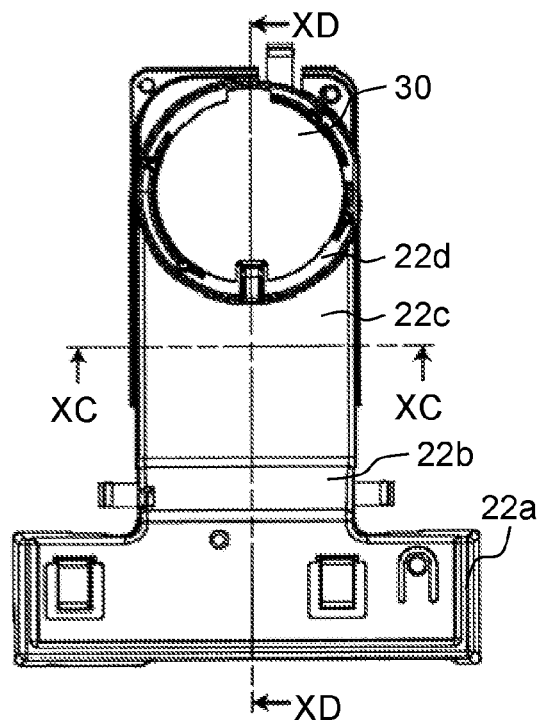
FIG. 10A is a plan view of the air guide of the induction cooking device according to the embodiment.
Figure 10B:
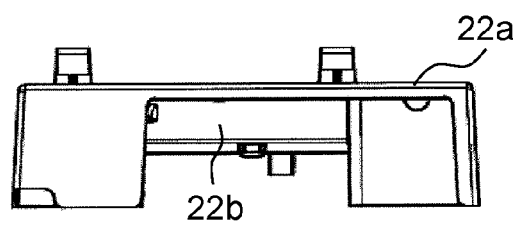
FIG. 10B is a front view of the air guide of the induction cooking device according to the embodiment.
Figure 10C:
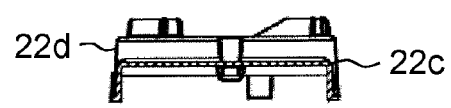
FIG. 10C is a cross-sectional view of the air guide of the induction cooking device according to the embodiment illustrated in FIG. 10A taken along line XC-XC.
Figure 10D:
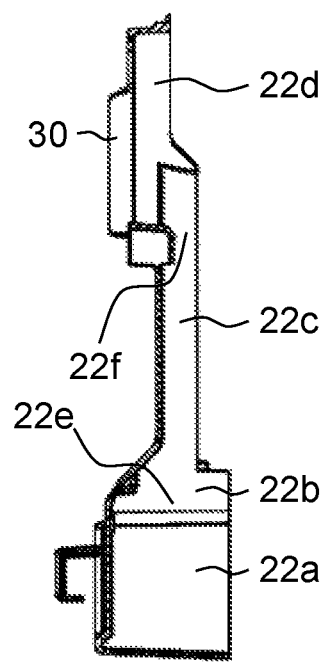
FIG. 10D is a cross-sectional view of the air guide of the induction cooking device according to the embodiment illustrated in FIG. 10A taken along line XD-XD.

FIGS. 8 to 10D illustrate air guide 22 which guides the second cooling air from second cooling fan 11 to the central region of heating coil unit 8. FIG. 8 is a perspective view illustrating air guide 22 of induction cooking device 1 according to the embodiment. FIG. 9 is a perspective view illustrating the undersurface of air guide 22 of induction cooking device 1 according to the embodiment. FIGS. 10A and 10B are a plan view and a front view of air guide 22 of induction cooking device 1 according to the embodiment, respectively. FIGS. 10C and 10D are cross-sectional views of air guide 22 of induction cooking device 1 according to the embodiment illustrated in FIG. 10A taken along line XC-XC and line XD-XD, respectively.

As illustrated in FIGS. 8 to 10D, air guide 22 includes fan storage 22a, narrowing portion 22b, guide portion 22c, and blowing portion 22d, and the constituent portions are integrally formed. Fan storage 22a stores second cooling fan 11 which is a cooling fan in the upper layer, and rearwardly guides the second cooling air blown through air outlet 29 of second cooling fan 11. Narrowing portion 22b narrows air flow path 23 from air outlet 29 of second cooling fan 11. Guide portion 22c guides the second cooling air from narrowing portion 22b to heating coil unit 8 located more rearwardly. Blowing portion 22d is disposed directly under the central region of heating coil unit 8, and forms exit vent 30.

Note that air guide 22 illustrated in FIGS. 8 to 10D has an open bottom. However, air guide 22 is disposed on the upper surface of upper cover 20a, and thus the guiding function of air guide 22 is achieved by air guide 22 and the upper surface of upper cover 20a forming air flow path 23. Accordingly, the upper surface of upper cover 20a which constitutes the bottom surface of air flow path 23 is formed smoothly so as to also have a guiding function, and furthermore narrows air flow path 23 through which the second cooling air flows, in order to increase the flow velocity of the second cooling air. In the present embodiment, the upper surface of upper cover 20a has a shape raised on the exit vent 30 side (see FIG. 6). Accordingly, air flow path 23 of air guide 22 through which the second cooling air flows is narrowed, and furthermore the second cooling air flowing through air flow path 23 of air guide 22 is smoothly blown through exit vent 30 upward.

In air guide 22 configured as described above, the cross-sectional area of air flow path 23 is narrowed by narrowing portion 22b, and the cross-sectional area of exit opening 22f, which is an exit on the exit vent 30 side at the downstream end of guide portion 22c, perpendicularly crossing the air flow direction of air flow path 23 is narrowed down to eventually half or less of air outlet 29 of second cooling fan 11, or in other words, the cross-sectional area of entrance opening 22e of air flow path 23 crossing perpendicularly to the air flow direction.

Note that in the configuration of the present embodiment, the ratio of areas (narrowing ratio) between the cross section (entrance opening area) of entrance opening 22e of air guide 22 perpendicularly crossing the air flow direction and the cross section (exit opening area) of exit opening 22f (at the downstream end of guide portion 22c) perpendicularly crossing the air flow direction is 5:2. Accordingly, the cross-sectional area of air flow path 23 is narrowed by air guide 22 down to half or less, whereby the second cooling air passing through air guide 22 is sent to exit vent 30 in a state where the flow velocity of the second cooling air has increased.

The narrowing ratio achieved by narrowing portion 22b is appropriately set, taken into consideration the specification of induction cooking device 1, the capability of first cooling fan 10, and the capability of second cooling fan 11. Thus, the narrowing ratio is not limited to the ratio described in the present embodiment. By adopting at least a configuration in which the flow velocity of the second cooling air is increased by air guide 22, the effect of cooling heating coil unit 8 can be increased even with a configuration in which small cooling fans are used.

Figure 11:
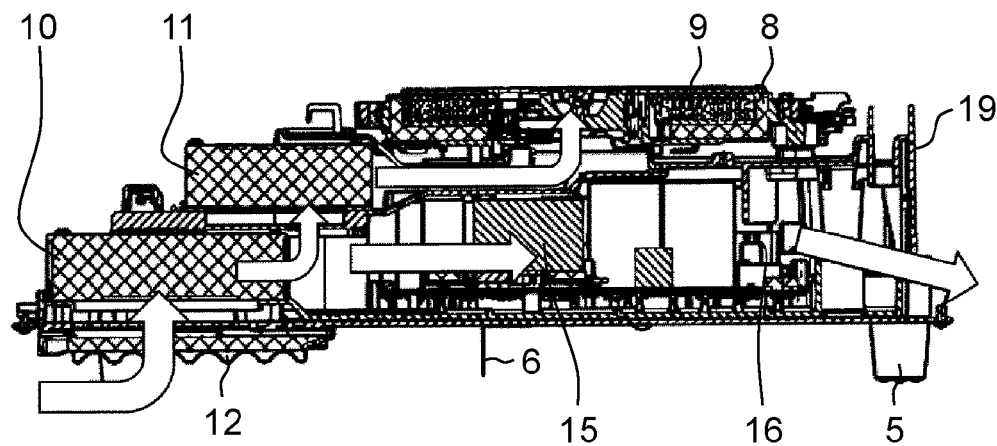
FIG. 11 is a diagram illustrating flows of cooling air in the induction cooking device according to the embodiment.
Figure 12:
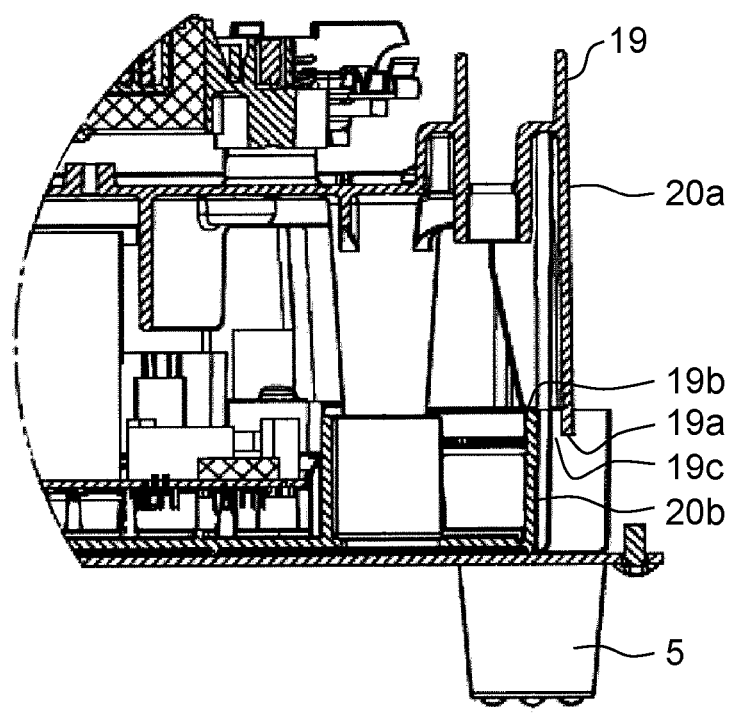
FIG. 12 is a cross-sectional view of the enlarged induction cooking device illustrated in FIG. 11 on the rear surface side.

FIG. 11 illustrates a flow of cooling air in induction cooking device 1 according to the embodiment. FIG. 11 illustrates a flow of cooling air when a small cooling mechanism in which two-layered cooling fans are used efficiently cools heat generating components and heat dissipating components. FIG. 11 illustrates a cross-section of housing 3 as viewed from the right in a state where top plate 2 and housing 3 are removed similarly to, for instance, FIG. 4 described above. FIG. 12 is a cross-sectional view of enlarged induction cooking device 1 illustrated in FIG. 11 on the rear surface side.

As illustrated in FIG. 12, lower edge portion 19a of upper cover 20a on the rear surface side is disposed in a position shifted rearwardly relative to upper edge portion 19b of lower cover 20b on the rear surface side. Upper edge portion 19b of lower cover 20b is above lower edge portion 19a of upper cover 20a. Accordingly, gap 19c is formed on the rear surface side of inner housing 19. Note that gap 19c between upper edge portion 19b and lower edge portion 19a is set to several millimeters (for example, 1 mm to 5 mm). Thus, gap 19c has a size which allows, after cooling, for instance, electronic components, the first cooling air to be reliably discharged from the rear surface side of induction cooking device 1, and also does not allow a finger of a person from accidentally getting into inner housing 19.

Induction cooking device 1 according to the present embodiment, first cooling fan 10 disposed in the lower layer takes in outside air from under bottom plate 21 of housing 3 on the front surface side, and blows the first cooling air, as illustrated in FIG. 11. The first cooling air reliably cools heat generating components and heat dissipating components of inverter circuit 15, driver 16, and power supply 17 inside lower cover 20b disposed inside induction cooking device 1. After that, the first cooling air passes through gap 19c on the rear surface side of inner housing 19, namely, gap 19c on the rear surface side between upper cover 20a and lower cover 20b, and is discharged through exhaust vents 13 in the rear surface of housing 3.

Second cooling fan 11 is disposed in the upper layer such that second cooling fan 11 overlaps at least a portion of first cooling fan 10 in the lower layer in plan view. Second cooling fan 11 takes in a portion of the first cooling air immediately after blown through air outlet 26 of first cooling fan 10. Second cooling fan 11 in the upper layer which has taken in a portion of the first cooling air from first cooling fan 10 in the lower layer blows the second cooling air to air guide 22 disposed on the upper surface of upper cover 20a. The second cooling air blown into air guide 22 is sent to blowing portion 22d directly under heating coil unit 8. The flow velocity of the second cooling air is increased by air guide 22. The upper surface of upper cover 20a which is the bottom surface of blowing portion 22d of air guide 22 is at a higher position than other portions. Thus, the second cooling air is blown through exit vent 30 upward, and cools heating coil unit 8, for instance. Note that the second cooling air, after cooling heating coil unit 8, for instance, flows to the rear surface side of induction cooking device 1 along the bottom surface of top plate 2, and thereafter is discharged through exhaust vents 13 of housing 3.

As described above, even if induction cooking device 1 according to the present disclosure is a compact device whose interior space is limited, small blowers are disposed appropriately so as to vertically overlap, and also air guide 22 which forms air flow path 23 and secures the volume of air that flows is disposed. Accordingly, improvement in cooling performance and a size reduction are both achieved, and thus induction cooking device 1 is a highly reliable cooking device.

As described above, the induction cooking device according to the present disclosure is a highly reliable induction cooking device which exhibits improved cooling performance, and furthermore has a reduced size and requires a smaller space to be installed, and thus is applicable to various cookware and has a high market value.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

What is claimed is:

1. An induction cooking device comprising:
   a housing in which at least one of a heat generating component and a heat dissipating component is disposed;
   a top plate which is held at an upper portion of the housing and on which an object to be heated is to be placed;
   a heating coil unit disposed inside the housing, below an undersurface of the top plate;
   a first cooling fan which is disposed inside the housing, and blows first cooling air to cool the at least one of the heat generating component and the heat dissipating component;
   a second cooling fan which is disposed inside the housing, takes in at least a portion of the first cooling air, and blows second cooling air to cool the heating coil unit, wherein
   the first cooling fan and the second cooling fan are disposed one above another such that at least a portion of the first cooling fan and at least a portion of the second cooling fan overlap in plan view; and
   an air guide which guides the second cooling air to the heating coil unit.

2. The induction cooking device according to claim 1, wherein
   the air guide increases a flow velocity of the second cooling air, and guides the second cooling air to the heating coil unit.

3. The induction cooking device according to claim 1, wherein
   the second cooling fan has an air inlet located directly above an air outlet of the first cooling fan.

4. The induction cooking device according to claim 1, further comprising:
   an intake restrictor disposed between an air outlet of the first cooling fan and an air inlet of the second cooling fan, and having an opening, wherein
   the intake restrictor restricts a volume of the at least a portion of the first cooling air which the second cooling fan takes in.

5. The induction cooking device according to claim 4, wherein
   the opening has an area which is at least 20% and at most 50% of an area of the air inlet of the second cooling fan.

6. The induction cooking device according to claim 1, wherein
   the second cooling fan is smaller in size than the first cooling fan, and has an air-blowing capability lower than an air-blowing capability of the first cooling fan.

7. The induction cooking device according to claim 1, wherein
   the air guide includes:
   an air flow path extending in an air flow direction;
   an entrance opening formed on an air entering side of the air flow path; and
   an exit opening formed on an air exiting side of the air flow path, and
   an area of the exit opening perpendicular to the air flow direction is at most half an area of the entrance opening perpendicular to the air flow direction.

8. The induction cooking device according to claim 1, further comprising:
   an inner housing in which the at least one of the heat generating component and the heat dissipating component is disposed, the inner housing being disposed inside the housing and supporting the heating coil unit from below, wherein
   the first cooling fan is disposed on a front surface side inside the inner housing, and
   the inner housing has, on a rear surface side, a gap for discharging the first cooling air, the first cooling air being discharged after cooling the at least one of the heat generating component and the heat dissipating component.

9. The induction cooking device according to claim 4, further comprising:
   a divider plate disposed at the air outlet of the first cooling fan, wherein
   the divider plate divides the first cooling air into portions according to an amount of heat dissipated by the at least one of the heat generating component and the heat dissipating component in the housing,
   the opening is directly above the divider plate, and
   the second cooling fan partially takes in each of the portions of the first cooling air divided by the divider plate through the opening.

10. The induction cooking device according to claim 1, wherein
    the housing includes a front surface which includes an inclined portion which is rearwardly inclined, and
    the first cooling fan and the second cooling fan are disposed one above another and staggered in a front-to-rear direction along the inclined portion.

* * * * *